United States Patent [19]

Weingartner

[11] Patent Number: 4,462,467

[45] Date of Patent: Jul. 31, 1984

[54] PERCUSSION DRILL MACHINE

[75] Inventor: Bernhard Weingartner, Feldkirch, Austria

[73] Assignee: Hilti Aktiengesellschaft, Schaan, Liechtenstein

[21] Appl. No.: 319,616

[22] Filed: Nov. 9, 1981

[51] Int. Cl.[3] ........................ B23B 45/16; B25D 16/00

[52] U.S. Cl. .................................... 173/105; 173/117; 310/50

[58] Field of Search ................................ 173/104-108, 173/117; 310/47, 50

[56] References Cited

U.S. PATENT DOCUMENTS

| | | | |
|---|---|---|---|
| 2,536,971 | 1/1951 | Weyandt et al. | 173/105 |
| 3,368,634 | 2/1968 | Lear | 173/105 |
| 3,858,666 | 1/1975 | Bailey et al. | 173/105 X |
| 3,874,460 | 4/1975 | Schmid et al. | 173/117 X |
| 3,921,729 | 11/1975 | Schmuck | 173/117 X |
| 4,113,035 | 9/1978 | Stiltz et al. | 173/104 X |
| 4,206,820 | 6/1980 | Bailey et al. | 173/105 |
| 4,276,941 | 7/1981 | Wanner et al. | 173/117 |

*Primary Examiner*—Frank T. Yost

*Attorney, Agent, or Firm*—Toren, McGeady and Stanger

[57] ABSTRACT

A percussion drill machine includes a drill shaft with a chuck for a drilling tool and a percussion device for imparting percussive force to the drilling tool held in the chuck. Each of the driving shaft and the percussive device has a separate electrical motor. The electrical motors can have a common stator or each motor may have its own stator. Each electrical motor has its own rotor and shaft. The shafts can be arranged coaxially with one being a hollow shaft laterally encircling the other. In another arrangement the shafts can be disposed in laterally spaced parallel relation.

7 Claims, 4 Drawing Figures

Figure 1:
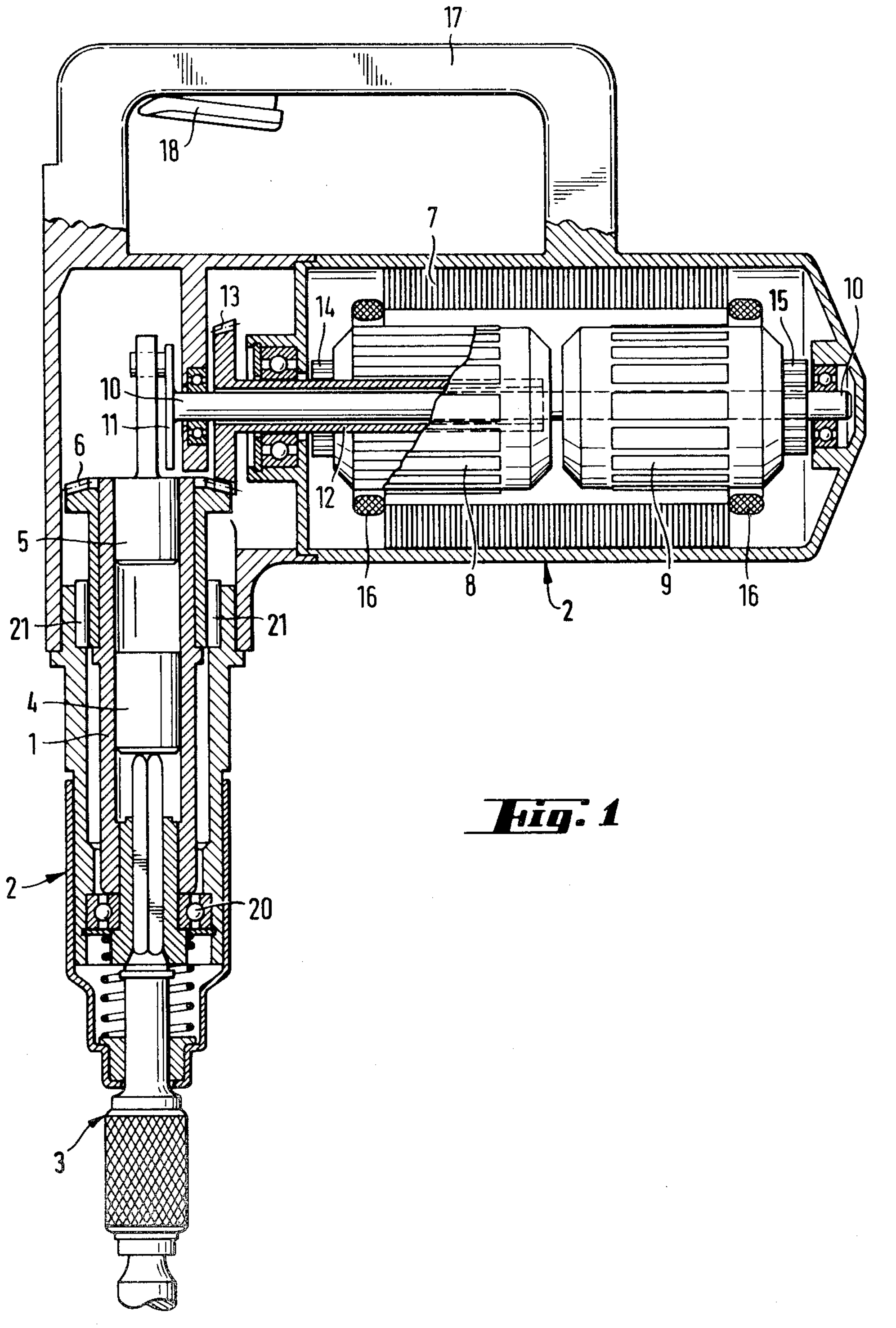

17
18
III
7'
9'
15'
10'
10'
11
5
16'
16'
13
1
6
12'
12'
12'
21
21
2
8'
14'
III
4
2
20
3

9'
7'
7'
10'
2
16'
8'
12'

PERCUSSION DRILL MACHINE

The invention relates to a percussion drill machine with a drill shaft and a chuck for the reception of a drilling tool, a percussion device which acts upon the drill shaft and the drilling tool, an electric driving element for turning the drilling tool and a second driving element for the percussion device.

In a known percussion drill machine which is likewise guided by hand, the drill shaft is driven via an electromotor with rotating armature via a reduction gear with constant gear ratio. A lifting magnet serves to drive the percussion mechanism. In order that this percussion device which is actuated by the lifting magnet can deliver an output that is utilizable in practice, the electromagnet and the vibrating masses must be so harmonized with each other that a resonance is present. This means that the percussion frequency is necessarily given.

With other percussion drill machines also, in which a single electromotor is provided for driving the drill shaft as well as for driving the percussion device, the work is done with a constant number of impacts per revolution. This is not practical, since the optimum drilling efficiency cannot be achieved when drilling members with different diameters are used. The number of impacts per revolution is set by the manufacturer for a drilling member having a median diameter. If, however, drilling members are used which have a diameter greatly diverging from a median diameter, substantially reduced drilling performances are the most that can be achieved.

It has already been attempted to develop percussion drill machines in which the number of impacts per revolution of the drilling member can be adapted to the diameter of the drilling member and to the material that is to be drilled. In such a drilling machine, a locking disk is connected with the drilling spindle in a manner that is rigid for rotation and unshiftable. This locking disk is in engagement with a second locking disk, which is connected with the housing, and a third locking disk was provided in addition to these two. In this arrangement two of these locking disks are situated coaxially. However, the gradation of these locking disks varies, and these two locking disks can be brought alternately into engagement with the third locking disk or can be disengaged as an entire unit. In this construction, which is unusually expensive mechanically, at least two percussion frequencies can be put into service.

The set object of the invention is to develop a percussion drill machine in which the ratio between the number of revolutions of the tool spindle and the percussion frequency is within broad limits freely and (as nearly as possible) infinitely optional, in order thus to achieve an optimum drilling efficiency for each particular task that arises.

According to the invention this object is achieved in that the driving element for turning the drill tool as well as the driving element for the percussion device are constructed as electromotors with rotating shafts, and in that the electromotors can be regulated independently of each other.

Thanks to this proposal, driving elements are available for turning the drill tool and the drill spindle as well as for the percussion device, with each driving element being controllable on its own. Since such percussion drill machines are, of course, hand operated, it is essential that the constructional form be compact and handy to manipulate. To meet this requirement it is provided, by a further proposal according to the invention, that the two electromotors have a common stator with a common field winding, and two rotors the armature currents of which can be regulated independently of each other. In this arrangement the two rotors can have coaxially situated shafts and one of the shafts can be constructed as a hollow shaft, and the two rotors (viewed in the stator's axial direction) are then situated one behind the other, with the shaft of one rotor penetrating the hollow shaft. Another spacesaving construction resides in that the two rotors have shafts situated parallel to each other and the stator is constructed in the shape of an H or approximately in the shape of an 8, with the two rotors (viewed in the stator's axial direction) being situated beside each other. If one stator with one field winding is provided for both rotors, it is expedient to engage for regulative purposes into the armature current circuit of the rotors. Another space-saving type of construction is also possible by the two rotors (arranged axially behind one another) having each its own stator with its own field winding, with the shaft of the one rotor penetrating the second rotor's shaft, which is constructed as a hollow shaft. Since separate field windings for both stators are present, engagement for regulative purposes can in this case also be made into the exciting winding or field winding.

Drive motors of all designs that are controllable can be used, for example, shunt motors or series-wound motors or medium-frequency motors, to name a few. The control itself can be achieved via conventional structural elements such as resistors. However, there is advantage in using electronic structural components for such regulative purposes, in order to be able as far as possible to regulate without loss. For this purpose there are available, for example, phase gating apparatuses or else impulse controls. This enumeration of motor types and control devices is by no means exhaustive but is to be regarded only as an enumeration of examples.

Figures 2, 3:
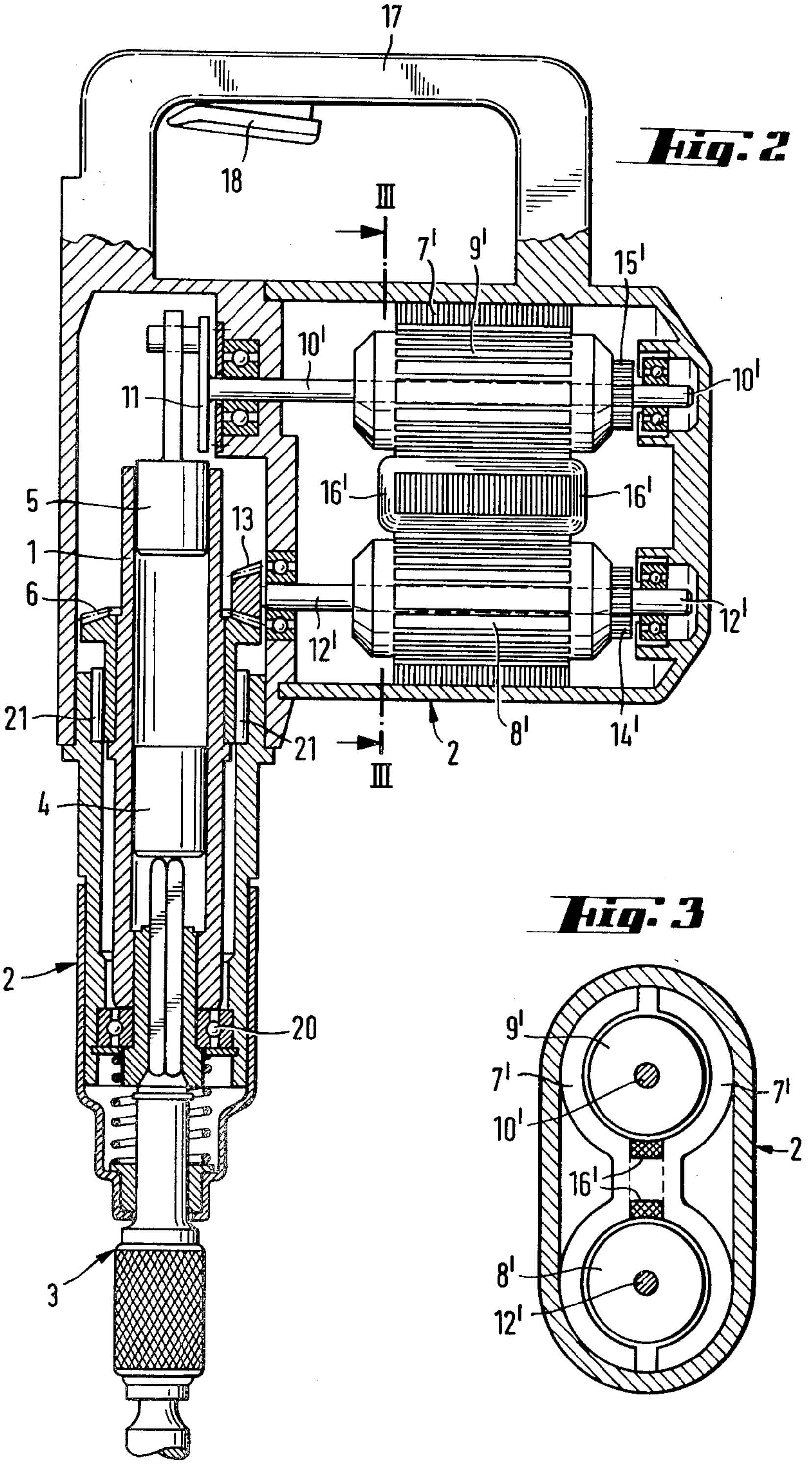
Figure 4:
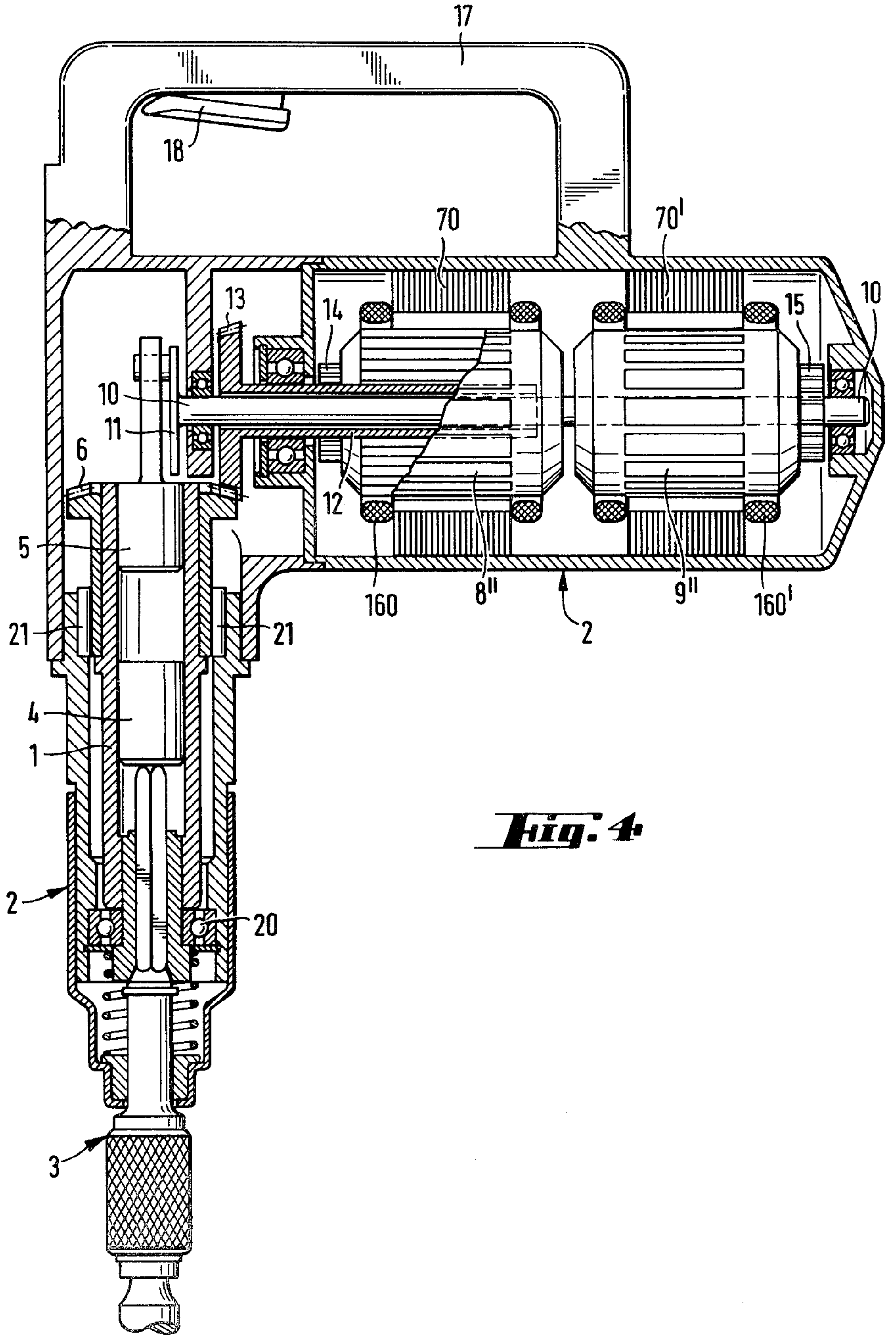

Without restricting the invention, three embodiments are explained with the aid of the drawing. Shown are:

FIGS. 1,2 and 4, show longitudinal sections, each through a different embodiment of the invention; and FIG. 3, is a cross-section view taken along the line III—III in FIG. 2.

A drill shaft 1 constructed as a hollow shaft is rotatably supported in a machine housing 2. A clamping chuck 3 is supported in this drill shaft 1, rigidly for rotation but movably on an axis. The hollow shaft 1 is fixed in the housing 2 by means of ball bearings 20 and roller bearings 21. In the hollow shaft 1 is a free piston 4 which interacts with a percussion piston 5. The drill shaft 1 has a bevel gear 6 in the region of its rear or inner end. The interaction of these parts is known per se, so that it need not be considered in detail here.

For driving the drill shaft 1 and the percussion piston 5, two electromotors are provided having rotating armatures 8 and 9 which are situated in a common stator 7 which supports a field winding 16. Viewed in the stator's 7 axial direction, armatures or rotors 8 and 9 are situated one behind the other. The rotor 9 is fixedly connected with the shaft 10 which at its inner end supports a crank drive 11, which is in an operative connection with the percussion piston 5 in a manner known per se. The armature or rotor 8 is connected rigidly for rotation with a hollow shaft 12 which is penetrated by the shaft 10 of the armature 9. This hollow shaft 12 supports at its front end a bevel gear 13 which meshes with the aforementioned bevel gear 6 of the drill shaft 1. Both rotors or armatures 8 and 9 support collectors 14 and 15. The brush sets belonging thereto are omitted from this drawing for the sake of clarity. The drive elements here can be constructed, for example, as series-wound motors, in which the armature currents are regulated. Both armature current circuits can in addition be regulated independently of each other, so that within broad limits the ratio between rotational speed and percussion frequency can be freely adjusted.

At the housing 2 there is also arranged a hand grip 17 which supports also an on-and-off switch 18 with which the tool can be connected to the line voltage. The toggles and handles required for regulating the frequencies and rotational speeds can be arranged laterally on the housing and are not shown here.

The embodiment according to FIG. 2 essentially corresponds to FIG. 1 in its mechanical construction, so that the same reference numbers are used to designate the same parts. The essential difference is that here the armatures or rotors 8' and 9' are situated beside each other with parallel shafts 10' and 12' and the stator 7' here has a shape similar to an 8 (FIG. 3). Instead of a crank gear 11 for driving the percussion piston 5, link-motion systems can also be used, as is already known in this connection.

The embodiment according to FIG. 4 differs from that according to FIG. 1 only in the construction of the stator, because here in this embodiment there is assigned to each armature or rotor 8'' and 9'' a stator 70 and 70', each stator having a field winding 160 and 160'. Because of the stator windings 160 and 160' here separately present, it is possible to make a regulating engagement into the current circuit of these stator windings for the required control purposes.

All drive devices are so constructed that the percussion drive can be disconnected as a whole. For controlling or regulating or otherwise influencing the field circuit as well as the armature current circuit, phase controls can be used, or else ohmic resistors; impulse controls are also usable for this purpose. Suitable for use as drive motors are induction motors, series-wound motors or shunt motors, also DC or AC generators.

The motors in this embodiment can be controlled completely independently of (separately from) each other, or else in such a way that there is a fixed, adjustable rotational speed ratio between the two motors. The rotational speed of one or of both motors can also, in a known manner, be steadily regulated independently of load.

Thanks to this measure, an optimum ratio between revolutions per minute and number of impacts per minute can constantly be achieved. This ratio is of course given not only by the size of the drilling member but also by the nature of the foundation material which is to be worked. If, for example, the foundation material is brittle, it is expedient that the initial drilling (counterbore) be done carefully at first and that the percussion then be gradually engaged with increasing energy.

In order to achieve a wide range of control, consideration was also given to inserting a planetary gearing between the rotating drill spindle and the back-and-forth-moving percussion pistons on the one hand and the two turning rotors 8,8',8'', and 9,9',9'', with the motors being so dimensioned that the one can be used for the power input and the other for the control. Such a drive mechanism, however, allows an independent regulation between rotational speed and percussion frequency only in a very limited range.

I claim:

1. Percussion drilling machine comprising a drill shaft with a chuck arranged to hold a drilling tool, a percussive device in cooperating relation with said drive shaft for imparting percussive force to a drilling tool held in said chuck, a first electrical driving unit in engagement with said drill shaft for rotating said drill shaft and a drilling tool held in said chuck, a second electrical driving unit in engagement with said percussive device for imparting percussive force to a driving tool held in said chuck, wherein the improvement comprises that each of said first and second electrical driving units is an electrical motor and each comprises a separate rotatable shaft and separate means for rotating said shaft so that each of said separate means can be controlled independently of the other for regulating the rotational force imparted from said rotatable shafts of said first and second electrical units to said drill shaft and said percussive device, a common stator for each of said separate electrical motors, and a separate rotor for each of said separate electrical motors so that each of said rotors can be controlled independently of the other.

2. Percussion drill machine, as set forth in claim 1, wherein said separate rotors are disposed in axial alignment and said shaft of one of said motors is a hollow shaft and laterally encircles said shaft of the other said electrical motor.

3. Percussion drill machine, as set forth in claim 1, wherein said shafts of said rotors are disposed in parallel laterally spaced relation and said stator is constructed generally in the configuration of a letter H with said rotors being coextensive in the axial direction of said stator.

4. Percussion drill machine comprising a drill shaft with a chuck arranged to hold a drilling tool, a percussive device in cooperating relation with said drive shaft for imparting percussive force to a drilling tool held in said chuck, a first electrical driving unit in engagement with said drill shaft for rotating said drill shaft and a drilling tool held in said chuck, a second electrical driving unit in engagement with said percussive device for imparting percussive force to a driving tool held in said chuck, wherein the improvement comprises that each of said first and second electrical driving units is an electrical motor and each comprises a separate rotatable shaft and separate means for rotating said shaft so that each of said separate means can be controlled independently of the other for regulating the rotational force imparted from said rotatable shafts of said first and second electrical units to said drill shaft and said percussive device, a separate stator for each of said separate electrical motors, and a rotor associated with each of said separate stators and said rotors being coaxially aligned one behind the other, and a field winding for each said stator.

5. Percussion drill machine comprising a drill shaft with a chuck arranged to hold a drilling tool, a percussive device in cooperating relation with said drive shaft for imparting percussive force to a drilling tool held in said chuck, a first electrical driving unit in engagement with said drill shaft for rotating said drill shaft and a drilling tool held in said chuck, a second electrical driving unit in engagement with said percussive device for imparting percussive force to a driving tool held in said chuck, wherein the improvement comprises that each of said first and second electrical driving units is an electrical motor and each comprises a separate rotatable shaft and separate means for rotating said shaft so that each of said separate means can be controlled independently of the other for regulating the rotational force imparted from said rotatable shafts of said first and second electrical units to said drill shaft and said percussive device, said drill shaft comprises an axially extending hollow drill shaft section, said percussive device includes a free piston axially displaceable within said hollow drill shaft section, a percussion piston located within said hollow drill shaft section rearwardly of said free piston, a crank drive secured to said percussion piston for moving said percussion piston in a reciprocating manner within said hollow drill shaft section, a separate rotor for each of said electrical motors, a shaft secured to said crank drive and to said electrical motor for driving said percussion device, a first bevel gear on one end of said drill shaft, a second bevel gear in meshed engagement with said first bevel gear, a hollow shaft connected to said electrical motor for driving said drill shaft and said hollow shaft connected to said second bevel gear for driving said second bevel gear, said rotors disposed one behind the other in the axial direction of said rotors, and a common stator for each of said rotors.

6. Percussion drill machine comprising a drill shaft with a chuck arranged to hold a drilling tool, a percussive device in cooperating relation with said drive shaft for imparting percussive force to a drilling tool held in said chuck, a first electrical driving unit in engagement with said drill shaft for rotating said drill shaft and a drilling tool held in said chuck, a second electrical driving unit in engagement with said percussive device for imparting percussive force to a driving tool held in said chuck, wherein the improvement comprises that each of said first and second electrical driving units is an electrical motor and each comprises a separate rotatable shaft and separate means for rotating said shaft so that each of said separate means can be controlled independently of the other for regulating the rotational force imparted from said rotatable shafts of said first and second electrical units to said drill shaft and said percussive device, said drill shaft comprises an axially extending hollow drill shaft section, said percussive device includes a free piston axially displaceable within said hollow drill shaft section, a percussion piston located within said hollow drill shaft section rearwardly of said free piston, a crank drive secured to said percussion piston for moving said percussion piston in a reciprocating manner within said hollow drill shaft section, a separate rotor for each of said electrical motors, a shaft secured to said crank drive and to said electrical motor for driving said percussion device, a first bevel gear on one end of said drill shaft, a second bevel gear in meshed engagement with said first bevel gear, a hollow shaft connected to said electrical motor for driving said drill shaft and said hollow shaft connected to said second bevel gear for driving said second bevel gear, said rotors disposed one behind the other in the axial direction of said rotors, and a separate stator for each of said rotors.

7. Percussion drill machine comprising a drill shaft with a chuck arranged to hold a drilling tool, a percussive device in cooperating relation with said drive shaft for imparting percussive force to a drilling tool held in said chuck, a first electrical driving unit in engagement with said drill shaft for rotating said drill shaft and a drilling tool held in said chuck, a second electrical driving unit in engagement with said percussive device for imparting percussive force to a driving tool held in said chuck, wherein the improvement comprises that each of said first and second electrical driving units is an electrical motor and each comprises a separate rotatable shaft and separate means for rotating said shaft so that each of said separate means can be controlled independently of the other for regulating the rotational force imparted from said rotatable shafts of said first and second electrical units to said drill shaft and said percussive device, said drill shaft comprises an axially extending hollow drill shaft section, said percussive device includes a free piston axially displaceable within said hollow drill shaft section, a percussion piston located within said hollow drill shaft section rearwardly of said free piston, a crank drive secured to said percussion piston for moving said percussion piston in a reciprocating manner within said hollow drill shaft section, a separate rotor for each of said electrical motors, a first shaft secured to said crank drive and to said electrical motor for driving said percussion device, a first bevel gear on one end of said drill shafts, a second bevel gear in meshed engagement with said first bevel gear, a second shaft connected to said electrical motor for driving said drill shaft and said second shaft connected to said second bevel gear for driving said second bevel gear, and said first and second shaft disposed in parallel laterally spaced relation.

* * * * *